(12) United States Patent
Lamorey

(10) Patent No.: US 10,032,560 B2
(45) Date of Patent: Jul. 24, 2018

(54) PHASE CHANGE MATERIAL VARIABLE CAPACITOR

(71) Applicant: WESTERN DIGITAL TECHNOLOGIES, INC., San Jose, CA (US)

(72) Inventor: Mark C. Lamorey, Williston, VT (US)

(73) Assignee: Western Digital Technologies, Inc., San Jose, CA (US)

( * ) Notice: Subject to any disclaimer, the term of this patent is extended or adjusted under 35 U.S.C. 154(b) by 22 days.

(21) Appl. No.: 14/940,819

(22) Filed: Nov. 13, 2015

(65) Prior Publication Data

US 2016/0071653 A1   Mar. 10, 2016

Related U.S. Application Data

(63) Continuation of application No. 13/926,296, filed on Jun. 25, 2013, now Pat. No. 9,253,822.

(51) Int. Cl.
| | | |
|---|---|---|
| *H01G 7/06* | (2006.01) | |
| *H01G 7/00* | (2006.01) | |
| *H05B 3/02* | (2006.01) | |
| *H01G 4/33* | (2006.01) | |
| *H01G 7/04* | (2006.01) | |
| *H01G 4/232* | (2006.01) | |
| *H01G 4/258* | (2006.01) | |

(52) U.S. Cl.
CPC ............... *H01G 7/00* (2013.01); *H01G 4/232* (2013.01); *H01G 4/33* (2013.01); *H01G 7/04* (2013.01); *H05B 3/023* (2013.01); *H01G 4/258* (2013.01); *Y10T 29/435* (2015.01)

(58) Field of Classification Search
CPC ............ H01G 7/00; H01G 7/04; H01G 4/232; H01G 4/258; H01G 5/16; H01G 5/14
See application file for complete search history.

(56) References Cited

U.S. PATENT DOCUMENTS

| | | | |
|---|---|---|---|
| 6,632,583 B2 | 10/2003 | Kunimoto et al. | |
| 6,974,707 B1 * | 12/2005 | Barie | C12Q 1/002 436/529 |
| 7,088,567 B2 * | 8/2006 | Hunt | H01G 5/0132 361/277 |
| 9,253,822 B2 * | 2/2016 | Lamorey | H05B 3/023 |
| 2010/0084624 A1 * | 4/2010 | Lung | H01L 45/06 257/2 |

(Continued)

FOREIGN PATENT DOCUMENTS

CN             102104480        6/2011

OTHER PUBLICATIONS

Office Action in related Chinese application 201410272994.2 dated Jul. 5, 2016, 7 pages.

(Continued)

*Primary Examiner* — Nguyen Ha
(74) *Attorney, Agent, or Firm* — Stoel Rives LLP

(57) ABSTRACT

A method of manufacturing a variable capacitor includes forming a capacitor conductor. The method also includes forming a phase change material adjacent the capacitor conductor. The method further includes forming a first contact on the capacitor conductor. The method additionally includes forming a second contact and a third contact on the phase change material.

20 Claims, 5 Drawing Sheets

(56) References Cited

U.S. PATENT DOCUMENTS

| | | | |
|---|---|---|---|
| 2011/0038093 A1* | 2/2011 | Furukawa | B81B 3/0072 |
| | | | 361/277 |
| 2011/0286150 A1 | 11/2011 | Kruglick | |
| 2012/0113341 A1* | 5/2012 | Uochi | G02F 1/136213 |
| | | | 349/38 |
| 2012/0266115 A1 | 10/2012 | Garbic et al. | |
| 2014/0055908 A1* | 2/2014 | Murata | H01G 5/16 |
| | | | 361/290 |
| 2014/0183699 A1 | 7/2014 | Dahlstrom | |
| 2016/0172113 A1* | 6/2016 | Reig | H01G 4/33 |
| | | | 361/278 |

OTHER PUBLICATIONS

"GeSbTe", http://en.wikipedia.org/wiki/GeSbTe, May 24, 2013; 5 Pages.
"Chalcogenide Glass", http://en.wikipedia.org/wiki/Chalcogenide_glass, Feb. 6, 2013; 4 Pages.
"Phase-change Memory", http://en.wikipedia.org/wiki/Phase-change_memory, Jun. 21, 2013; 8 Pages.

* cited by examiner

PHASE CHANGE MATERIAL VARIABLE CAPACITOR

FIELD OF THE INVENTION

The invention relates to integrated circuit devices and, more particularly, to variable capacitors that utilize phase change material and methods of making the same.

BACKGROUND

Variable capacitors are commonly used in electrical circuits such as a variable frequency oscillator, tuned amplifier, phase shifter, impedance-matching circuit and the like. A mechanically controlled variable capacitor typically includes an interelectrode spacing (or an electrode overlap area) between a pair of electrodes, which spacing can be controllably varied in order to selectively vary the capacitance between the electrodes. An electronically controlled variable capacitor relies on constantly applying a DC bias voltage to an element of the capacitor to change an electrical property of the element, thereby changing the capacitance as long as the bias voltage is applied. Conventionally, a silicon oxide ($SiO_2$) thin film, a silicon nitride ($Si_3N_4$) thin film, and a tantalum oxide ($Ta_2O_5$) thin film have commonly been used for forming a thin film capacitor. A recent trend is to manufacture variable capacitors using Micro-Electro-Mechanical Systems (MEMS) technology. However, all of these approaches involve physically moving a portion of the capacitor and/or constantly applying a DC bias voltage in order to change the capacitance.

SUMMARY

In a first aspect of the invention, there is a method of manufacturing a variable capacitor. The method includes forming a capacitor conductor. The method also includes forming a phase change material adjacent the capacitor conductor. The method further includes forming a first contact on the capacitor conductor. The method additionally includes forming a second contact and a third contact on the phase change material.

In another aspect of the invention, there is a method of changing a capacitance of a capacitor. The method includes selectively setting a phase change material included in the capacitor to one of a crystalline phase and an amorphous phase.

In another aspect of the invention, a variable capacitor includes a capacitor conductor and a phase change material that is selectively changeable between one of a first phase and a second phase. The variable capacitor has a first capacitance when the phase change material is in the first phase and a second capacitance different from the first capacitance when the phase change material is in the second phase.

In another aspect of the invention, a design structure tangibly embodied in a machine readable storage medium for designing, manufacturing, or testing an integrated circuit is provided. The design structure comprises the structures of the present invention. In further embodiments, a hardware description language (HDL) design structure encoded on a machine-readable data storage medium comprises elements that when processed in a computer-aided design system generates a machine-executable representation of an variable capacitor which comprises the structures of the present invention. In still further embodiments, a method in a computer-aided design system is provided for generating a functional design model of the variable capacitor. The method comprises generating a functional representation of the structural elements of the variable capacitor.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

The invention relates to integrated circuit devices and, more particularly, to variable capacitors that utilize phase change material and methods of making the same. According to aspects of the invention, a capacitor is formed using a phase change material that can be selectively changed between one of a first phase (e.g., amorphous) and a second phase (e.g., crystalline). In embodiments, the first phase and the second phase provide the phase change material with different electrical properties, such that the capacitor has a first capacitance when the phase change material is in the first phase and the capacitor has a second, different capacitance when the phase change material is in the second phase. In this manner, implementations of the invention provide a variable capacitor that may be selectively set to one of a first capacitance and a second capacitance by setting the phase change material to one of the first phase and the second phase.

The term "phase change materials" or "phase change material" as used herein refers to material(s) that can switch reversibly between a first phase and a second, different phase, such as between an amorphous phase and a crystalline phase, between a polycrystalline phase and a monocrystalline phase, and/or between a first and second monocrystalline phases of different crystal structures. The phase change in the phase change material(s) may be achieved by various mechanisms, including but not limited to: heating at different temperatures, applying different voltages or electrical currents, etc. The phase change typically leads to volumetric expansion or contraction of the phase change material(s).

Figure 1:
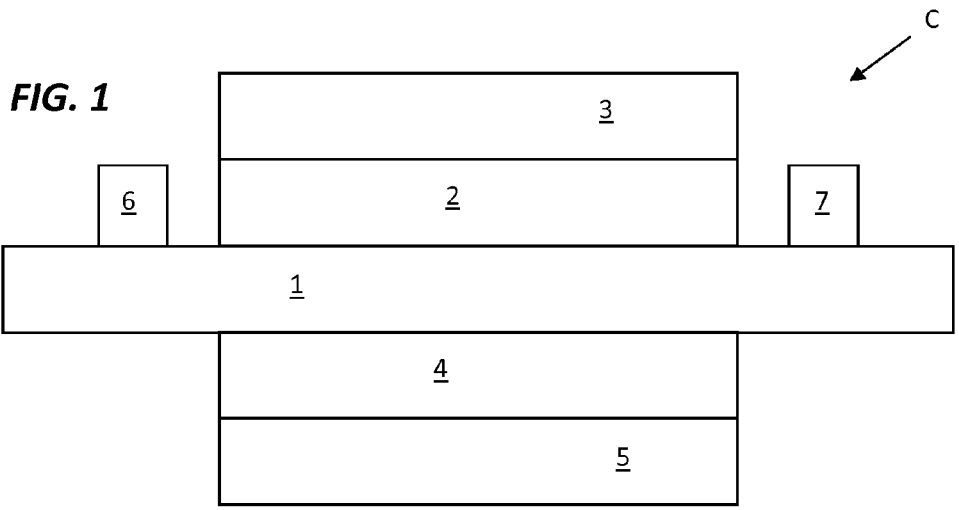
FIGS. 1-3 show variable capacitor structures in accordance with aspects of the invention.

FIG. 1 depicts a variable capacitor "C" with phase change material (PCM) in accordance with an embodiment of the present invention. In embodiments, a PCM layer 1 is located between an upper dielectric layer 2 and a lower dielectric layer 4. Directly above the upper dielectric layer 2 is an upper conductor layer 3 which acts as an electrode in the capacitor C and also acts as a terminal of the capacitor C. Directly below the lower dielectric layer 4 is a lower conductor layer 5 with acts as the other electrode in the capacitor C and also acts as the other terminal of the capacitor C.

In embodiments, the PCM layer 1 has a contact 6 (e.g., a small connecting metal control terminal) on one side of the PCM layer 1 and a contact 7 (e.g., another small connecting metal control terminal) on the opposite side of the PCM layer 1. The contacts 6 and 7 allow for control of the volume and electrical characteristics of the PCM layer 1.

By applying a voltage difference between the contacts 6 and 7, the volume and electrical characteristics of the PCM layer 1 can be changed. The volume and electrical characteristics of the PCM layer 1 can also be changed through applying heat to the PCM layer 1 to induce the phase change.

Because of the properties of PCM, heat or electricity only needs to be applied once to change the electrical characteristics of the PCM and therefore the capacitance of the variable capacitor. This is an advantage over conventional variable capacitors in that conventional capacitors must continually apply a bias voltage to vary the capacitance, whereas with the PCM variable capacitor a voltage is only applied once for a predefined duration (i.e., to affect the phase change) and the capacitance will stay at the static desired capacitance value.

The PCM layer 1 may be composed of any suitable material with phase change properties or any mixture of materials wherein at least one of the materials in the mixture has phase change properties. One choice for the PCM layer would be Chalcogenide, although the invention is not limited to this material and other materials may be used as described herein.

Figure 2:
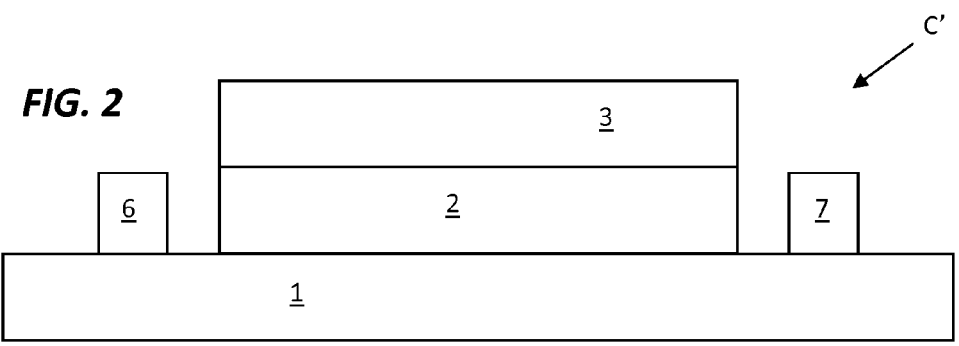

FIG. 2 depicts a variable capacitor C' with phase change material in accordance with another embodiment of the present invention. As in the above embodiment, a PCM layer 1 is present with an oxide layer 2 above it and a conductor layer 3 above the oxide layer 2. The contacts 6 and 7 are also present and function as described above. However, in capacitor C', there is no lower oxide layer and no lower metal layer.

Figure 3:
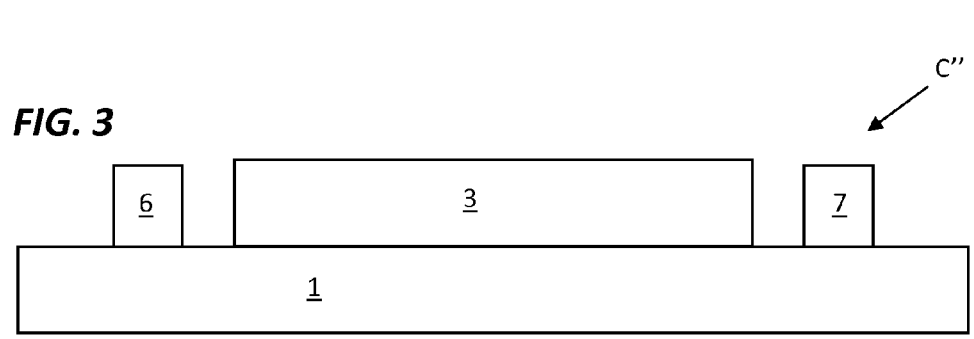

FIG. 3 depicts a variable capacitor C" with phase change material in accordance with another embodiment of the present invention. As in the above embodiments, a PCM layer 1 is present with a conductor layer 3 above it. The contacts 6 and 7 are also present and function as described above. However, in capacitor C", there are no oxide layers and no lower metal layer. The conductor layer 3 is in direct contact with the PCM layer 1 in this embodiment.

Figure 4:
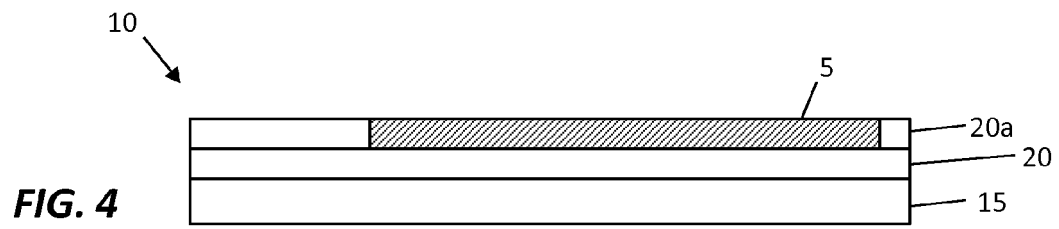
FIGS. 4-11 show processing steps and structures in accordance with aspects of the invention.

FIGS. 4-9 show processing steps and structures in accordance with aspects of the invention, in which like reference numerals represent similar elements to those described above. In particular, FIG. 4 shows a cross section of a portion of a semiconductor structure 10 comprising a substrate 15, which may comprise any suitable substrate, such as a silicon-on-insulator (SOI) substrate (e.g., including a substrate, a buried insulator layer, and a semiconductor layer) or bulk material substrate (e.g., including doped regions typically referred to as wells). The substrate 15 may be composed of any suitable material including, but not limited to, Si, SiGe, SiGeC, SiC, GE alloys, GaAs, InAs, InP, and other III/V or II/VI compound semiconductors.

As shown in FIG. 4, at least one insulator layer 20 is formed on the substrate 15. The at least one insulator layer 20 may comprise any desired number of layers of electrically insulating material (e.g., dielectric material), such as silicon dioxide ($SiO_2$), tetraethylorthosilicate (TEOS), borophosphosilicate glass (BPSG), hydrogen silsesquioxane (HSQ), etc. Such layers are commonly referred to as inter-level dielectric (ILD) layers, wiring levels, etc. For example, a lowermost one of the at least one insulator layer 20 has a vertical thickness sufficient to cover (e.g., encapsulate) any devices (e.g., transistors, etc.) that are formed on the top surface of the substrate 15, while subsequent ones of the at least one insulator layer 20 may have any desired thickness ranging, for example, from about 0.2 μm for the lower layers to about 4-6 μm for the upper layers.

Still referring to FIG. 4, insulator layer 20a and lower conductor 5 are formed on the at least one insulator layer 20. Insulator layer 20a and lower conductor 5 may be formed using conventional semiconductor manufacturing processes. For example, insulator layer 20a may be formed on the at least one insulator layer 20 using chemical vapor deposition (CVD) or other suitable deposition process. After being formed, insulator layer 20a may be patterned using photolithographic masking and etching. More specifically, a photomask may provided by forming a layer of photoresist material on the uppermost one of the insulator layer 20a, exposing the photoresist material to a pattern of light, and developing the exposed photoresist material. An etching process, such as one or more reactive ion etch (RIE) processes, may then be used to form one or more trenches in insulator layer 20a by removing material not covered by the photomask. After etching, the photomask may be removed using a conventional ashing or stripping process. After patterning, lower conductor 5 may be formed in the trench in insulator layer 20a. For example, lower conductor 5 may be formed in the trench by CVD, sputtering, or other suitable process. A planarization process, such as chemical mechanical polishing (CMP), may be performed after forming lower conductor 5 to make the upper surfaces of lower conductor 5 and insulator layer 20a substantially coplanar.

Alternatively, lower conductor 5 may be formed before insulator layer 20a. For example, lower conductor 5 may be conformally deposited on the at least one insulator layer 20 and patterned, e.g., using masking and etching. Insulator layer 20a may then be formed on lower conductor 5 and the at least one insulator layer 20, and a planarization process (e.g., CMP) may be used to remove portions of insulator layer 20a covering lower conductor 5.

Insulator layer 20a and lower conductor 5 may also be formed using conventional semiconductor manufacturing materials. For example, insulator layer 20a may be composed of any suitable ILD material, such as those described with respect to insulator layer 20. Lower conductor 5 may be composed of any suitable electrically conductive material, such as: a metal (e.g., tungsten, titanium, tantalum, ruthenium, zirconium, cobalt, copper, aluminum, lead, platinum, tin, silver, gold, etc.), a conducting metallic compound material (e.g., tantalum nitride, titanium nitride, tungsten silicide, tungsten nitride, ruthenium oxide, cobalt silicide, nickel silicide, etc.), alloys, or any suitable combination of any number of these materials. The conductive material may further comprise dopants that are incorporated during or after deposition.

Figure 5:
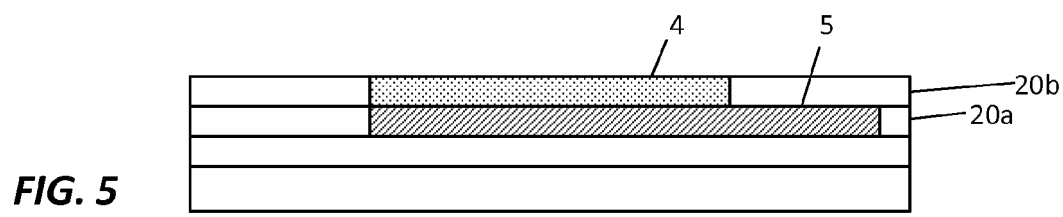

As shown in FIG. 5, an insulator layer 20b and lower dielectric 4 are formed on the insulator layer 20a and lower conductor 5. Insulator layer 20b and lower dielectric 4 may be formed in a manner similar to that described with respect to insulator layer 20a and lower conductor 5, e.g., using any suitable combination of depositing, masking and etching, and planarizing steps. Insulator layer 20b may be composed of any suitable ILD material, such as those already described with respect to insulator layer 20. Lower insulator 4 may be composed of any insulator material suitable for use as an electrical insulator in a capacitor, including but not limited to: oxide, nitride, oxynitride, etc.

Figure 6:
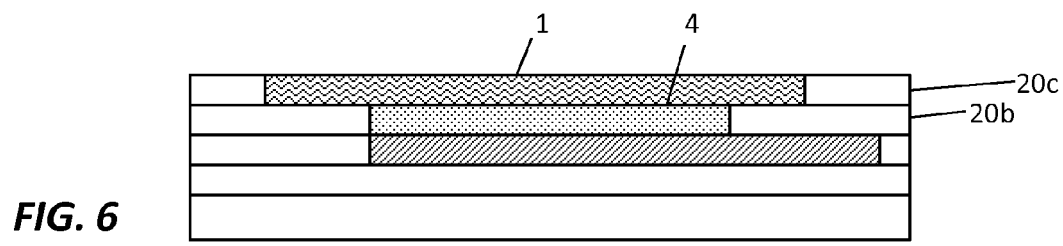

As shown in FIG. 6, an insulator layer 20c and phase change material (PCM) 1 are formed on the insulator layer 20b and lower dielectric 4. Insulator layer 20c and PCM 1 may be formed in a manner similar to that described with respect to insulator layer 20a and lower conductor 5, e.g., using any suitable combination of depositing, masking and etching, and planarizing steps. Insulator layer 20c may be composed of any suitable ILD material, such as those already described with respect to insulator layer 20.

PCM 1 is composed of a material that is capable of being reversibly changed between two stable phases, crystalline and amorphous. In embodiments, PCM 1 is a chalcogenide glass, such as GeSbTe, AgSbTe, AgInSbTe, InSe, SbSe, SbTe, InSbSe, InSbTe, GeSbSe, GeSbTeSe, AgInSbSeTe, etc., although the invention is not limited to these examples and any suitable phase change material may be used. PCM 1 may be formed using conventional manufacturing techniques, such as metalorganic chemical vapor deposition (MOCVD), etc.

Figure 7:
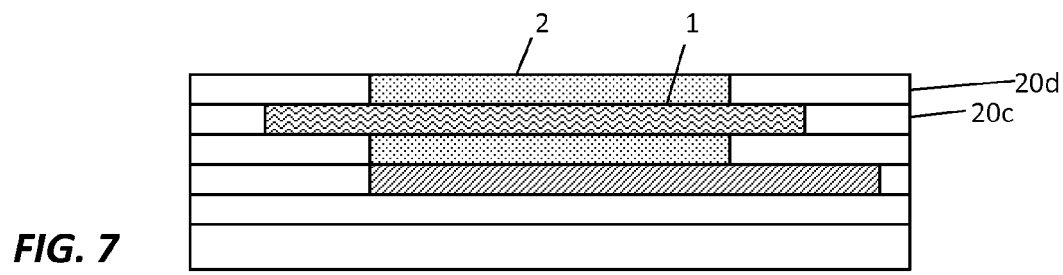

As shown in FIG. 7, an insulator layer 20d and upper dielectric 2 are formed on the insulator layer 20c and PCM 1. Insulator layer 20d and upper dielectric 2 may be formed in a manner similar to that described with respect to insulator layer 20a and lower conductor 5, e.g., using any suitable combination of depositing, masking and etching, and planarizing steps. Insulator layer 20b may be composed of any suitable ILD material, such as those already described with respect to insulator layer 20. Upper insulator 2 may be composed of any insulator material suitable for use as an electrical insulator in a capacitor, including but not limited to: oxide, nitride, oxynitride, etc.

Figure 8:
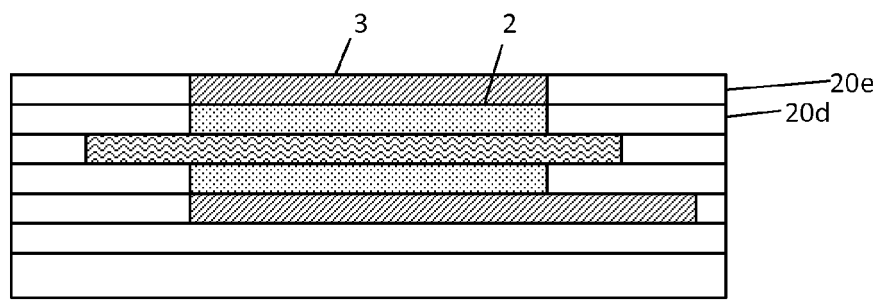

As shown in FIG. 8, an insulator layer 20e and upper conductor 3 are formed on the insulator layer 20d and upper dielectric 2. Insulator layer 20e and upper conductor 3 may be formed in a manner similar to that described with respect to insulator layer 20a and lower conductor 5, e.g., using any suitable combination of depositing, masking and etching, and planarizing steps. Insulator layer 20e may be composed of any suitable ILD material, such as those already described with respect to insulator layer 20. Upper conductor 3 may be composed of any conductive material suitable for use as an electrical conductor in a capacitor, including but not limited to: metal, conducting metallic compound, alloy, etc.

Figure 9:
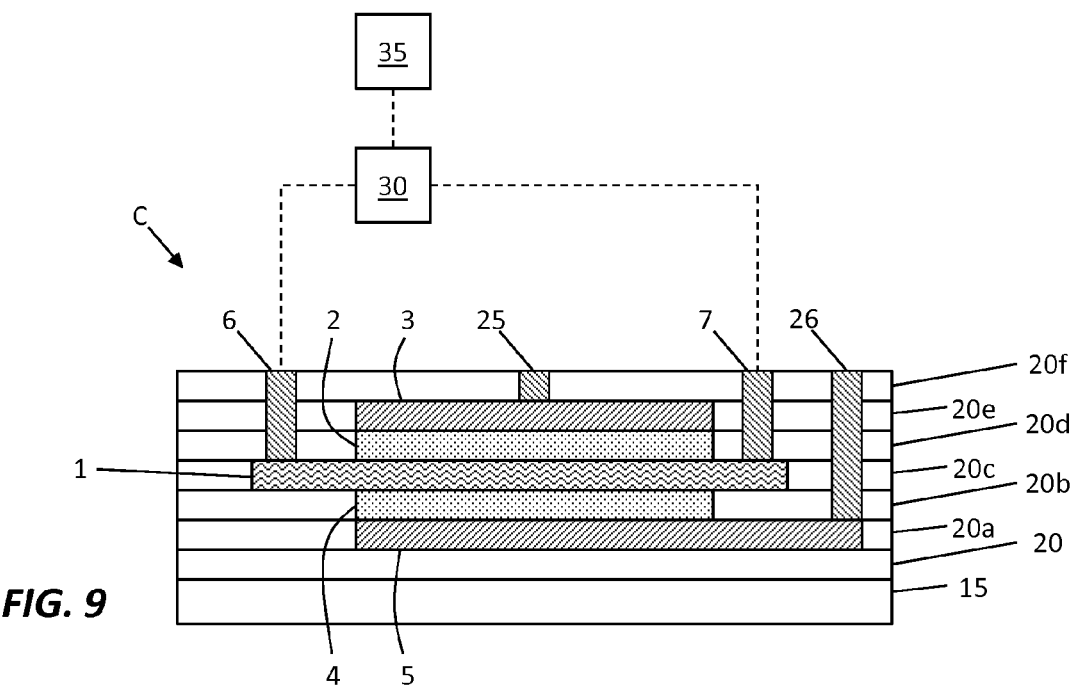

As shown in FIG. 9, an insulator layer 20f is formed on insulator layer 20e and upper conductor 3, and contacts 6, 7, 25, 26 are formed. Insulator layer 20f may be formed in a conventional manner, e.g., CVD, and may be composed of conventional ILD material, such as those already described with respect to insulator layer 20. Contacts 6, 7, 25, and 26 may be formed by creating holes in the insulator layers and filling the holes with electrically conductive material. The holes may be formed by masking and etching, e.g., forming and patterning a mask on insulator layer 20f and etching holes into the insulator layers through the mask. The etching may be any suitable etching process, such as RIE. After etching, the holes may be filled with any suitable electrically conductive material, e.g., metal, conducting metallic compound, alloy, etc., such as aluminum, copper, titanium, or tungsten. The electrically conductive material may be formed in the holes using any suitable process, such as CVD, etc. In embodiments, the mask is removed after forming the contacts, e.g., after forming the holes or after filling the holes.

In aspects of the invention, contacts 6 and 7 extend through insulator layers 20d, 20e, and 20f and directly contact PCM 1. In additional aspects of the invention, contact 25 extends through insulator layer 20f and directly contacts upper conductor 3, and contact 26 extends through insulator layers 20b-f and directly contacts lower conductor 5. In this manner, contacts 6 and 7 provide electrically conductive paths to PCM 1, contact 25 provides an electrically conductive path to upper conductor 3, and contact 26 provides an electrically conductive path to lower conductor 5.

Still referring to FIG. 9, in embodiments, contacts 6 and 7 are located at opposite lateral ends of PCM 1. In aspects of the invention, PCM 1 extends laterally beyond both upper conductor 3 and upper dielectric 2 to provide a landing area for contacts 6 and 7, e.g., when contacts 6 and 7 are formed vertically. This results in upper conductor 3 and upper dielectric 2 being laterally between contacts 6 and 7. In additional aspects of the invention, lower conductor 5 extends laterally beyond PCM 1 to provide a landing area for contact 26 when contact 26 is formed vertically.

According to aspects of the invention, contacts 6 and 7 constitute control terminals for changing the phase of PCM 1 between crystalline and amorphous. More specifically, in embodiments, the phase of PCM 1 (e.g., crystalline or amorphous) is programmed through a heating and cooling process which is electrically controlled by passing a current through PCM 1 via contacts 6 and 7 (e.g., by applying a voltage potential across contacts 6 and 7) and the resulting ohmic heating that occurs. Heating of PCM 1 may additionally or alternatively be provided by a heating element in close proximity to PCM 1. Depending upon the specific applied temperature and duration of heating applied to PCM 1, the PCM 1 is either "set" to a lower resistivity crystalline phase or "reset" to a higher resistivity amorphous phase (e.g., higher than the lower resistivity crystalline phase).

The changing of the phase of PCM 1 typically requires a high temperature (e.g., above 200° C. to 900° C. depending on material properties), as can be obtained by Joule heating from current flowing through the phase change material or a discrete resistor. When the PCM 1 is heated above its melting temperature and thereafter quickly cooled, the PCM 1 becomes amorphous and has a relatively high resistivity (i.e., acts as an electrical insulator). Alternatively, when the PCM 1 is heated above its crystallization temperature and maintained at that temperature for a predetermined time before cooling, the PCM 1 becomes crystalline and has a relatively low resistivity (i.e., acts as an electrical conductor).

In an exemplary thermal cycling operation of PCM 1, a first thermal cycling operation includes a "RESET" pulse for converting PCM 1 from crystalline to amorphous form, and a second thermal cycling operation includes a "SET" pulse for converting the PCM 1 from amorphous to crystalline form. During the RESET pulse, the temperature of PCM 1 is raised above its melting temperature ($T_m$) by applying a current through PCM 1 via contacts 6 and 7, followed by a rapid quench over a short predefined time $t_1$. As a result of the rapid quench, the disordered arrangement of atoms of the PCM 1 due to the melt is retained. Thus, the PCM 1 is left in a high resistivity (i.e., electrically insulative) amorphous phase after the RESET pulse. During the SET pulse, the PCM 1 is annealed (e.g., heated by applying a current through PCM 1 via contacts 6 and 7) at a lower temperature with respect to the melting temperature, and for a longer predefined time $t_2$ with respect to $t_1$. This process enables the amorphous form to crystallize into a lower resistive phase, leaving the PCM 1 in a low resistivity (i.e., electrically conductive) crystalline phase.

According to aspects of the invention, heating the PCM 1 to selectively set the PCM 1 to one of the crystalline and amorphous phases (e.g., the SET or RESET pulse) is controlled by a control device 30 that is connected to at least one of contacts 6 and 7, e.g., by wires, interconnects, etc. The control device 30 may comprise one or more circuit elements (e.g., switch, timer, etc.) for applying current (or voltage) from a current/voltage source 35 to PCM 1 via at least one of contacts 6 and 7. Some or all of the control device 30 and/or the current/voltage source 35 may be formed on the same chip as the PCM 1.

Still referring to FIG. 9, in aspects of the invention, the PCM 1 is part of a variable capacitor C similar to that shown in FIG. 1. More specifically, the capacitor C includes upper conductor 3 as a first capacitor conductor (e.g., first capacitor plate), lower conductor 5 as a second capacitor conductor (e.g., second capacitor plate), and the combination of upper dielectric 2, PCM 1, and lower dielectric 4 as the capacitor dielectric. The capacitance of capacitor C depends in part on the permittivity of the capacitor dielectric. The capacitor dielectric has an overall permittivity that is a function of the permittivity of each of its components, i.e., the permittivity of each of the upper dielectric 2, PCM 1, and lower dielectric 4. The PCM 1 has a first permittivity when it is in the less conductive amorphous phase, and a second, different permittivity when it is in the more conductive crystalline phase. Changing the phase of the PCM 1 thus changes the permittivity of PCM 1, which changes the permittivity of capacitor dielectric, which changes the capacitance of capacitor C. As such, in aspects of the invention, the capacitor C may be set to a first capacitance by placing PCM 1 in the amorphous phase (e.g., with a RESET pulse), and the capacitor C may be set to a second capacitance that is different from the first capacitance by placing PCM 1 in the crystalline phase (e.g., with a SET pulse).

According to aspects of the invention, the phase of PCM 1, and thus the capacitance of capacitor C, is set by applying current to PCM 1 via contacts 6 and 7 for a predefined duration (e.g., $t_1$ or $t_2$). After the phase of PCM 1 is set, e.g., to the amorphous phase or the crystalline phase, the current is no longer applied to PCM 1 via contacts 6 and 7. The PCM 1 then stays in the selected phase, e.g., the amorphous phase or the crystalline phase, after the current is turned off and until sufficient current is applied at a later time (e.g., until a SET or RESET pulse is applied at a later time). As such, the capacitor C stays at the selected capacitance, e.g., the first capacitance or the second capacitance, after the current is turned off and until sufficient current is applied again at a later time (e.g., until a SET or RESET pulse is applied again at a later time). In this manner, current is only applied to the PCM 1 for a short predefined duration (e.g., $t_1$ or $t_2$), after which the capacitance of the capacitor C remains steady until such time as the phase of the PCM is changed again. This represents an advantage over other electrically controlled capacitors in which a change in capacitance is only achieved so long as a bias voltage is continuously applied to a portion of the capacitor.

Figure 10:
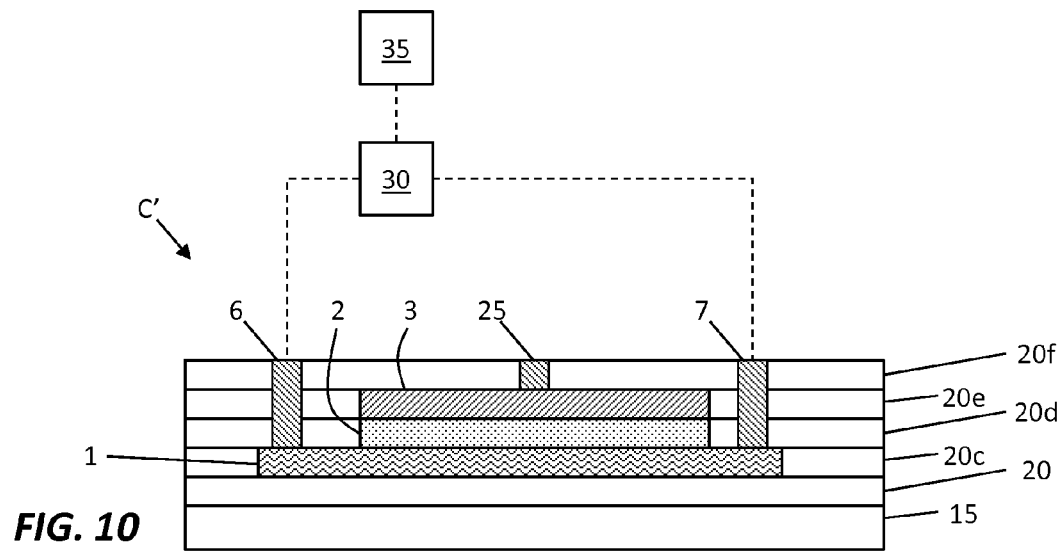

FIG. 10 shows a semiconductor structure including a variable capacitor C' similar to that illustrated in FIG. 2. In the structure of FIG. 10, like reference numerals represent similar elements to those described with respect to FIGS. 4-9. For example, the capacitor C' includes PCM 1, upper dielectric 2, upper conductor 3, and contacts 6, 7, and 25, which may be formed using similar processes and materials as described with respect to FIGS. 4-9. In capacitor C', contacts 6 and 7 may be used to supply current to PCM 1 to selectively change the phase of PCM 1 between amorphous and crystalline, e.g., using switch 30 and current/voltage source 35 as described herein.

Still referring to FIG. 10, in accordance with aspects of the invention, one of contacts 6 and 7 may be used as the second capacitor contact. For example, contact 25 may be a first capacitor contact and contact 6 (or 7) may be a second capacitor contact for capacitor C'. In accordance with aspects of the invention, capacitor C' has a first capacitance between contact 25 and contact 6 (or 7) when PCM 1 is in a first phase (e.g., amorphous), and capacitor C' has a second capacitance between contact 25 and contact 6 (or 7) when PCM 1 is in a second phase (e.g., crystalline). The second capacitance is different than the first capacitance due to the difference in electrical properties of the PCM 1 between the first phase and the second phase. For example, on the one hand, when PCM 1 is in the crystalline phase (e.g., conductive), the upper dielectric 2 is the capacitor dielectric, with the upper conductor 3 being a first capacitor conductor and the PCM 1 being a second capacitor conductor. On the other hand, when the PCM 1 is in the amorphous phase (e.g., resistive), the upper dielectric 2 and the PCM 1 combined serve as the capacitor dielectric, with the upper conductor 3 being a first capacitor conductor and the contact 6 (or 7) being the second capacitor conductor. In this manner, changing the phase of PCM 1 can be used to change the capacitance of capacitor C'.

Figure 11:
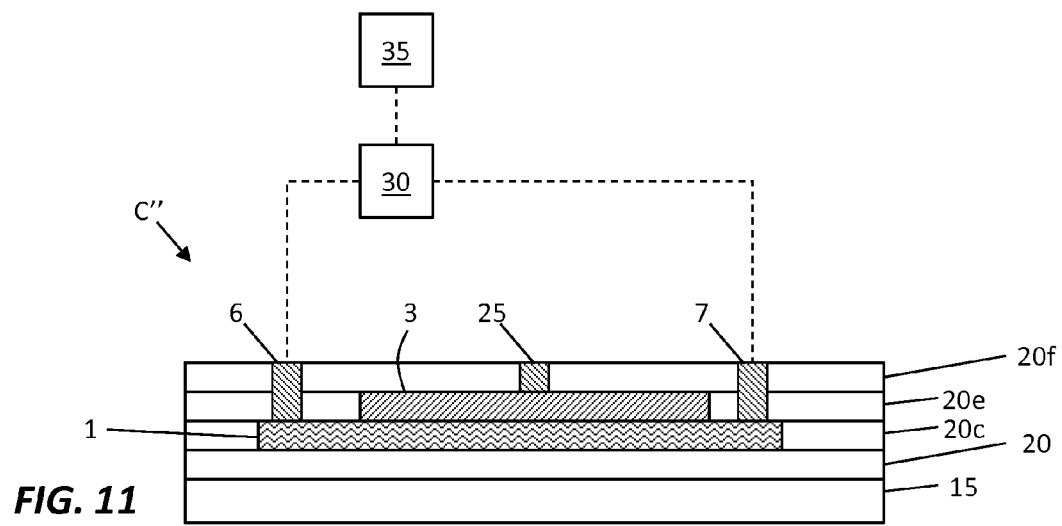

FIG. 11 shows a semiconductor structure including a variable capacitor C" similar to that illustrated in FIG. 3. In the structure of FIG. 11, like reference numerals represent similar elements to those described with respect to FIGS. 4-9. For example, the capacitor C" includes PCM 1, upper conductor 3, and contacts 6, 7, and 25, which may be formed using similar processes and materials as described with respect to FIGS. 4-9. In capacitor C", contacts 6 and 7 may be used to supply current to PCM 1 to selectively change the phase of PCM 1 between amorphous and crystalline, e.g., using switch 30 and current/voltage source 35 as described herein.

Still referring to FIG. 11, in accordance with aspects of the invention, one of contacts 6 and 7 may be used as the second capacitor contact. For example, contact 25 may be a first capacitor contact and contact 6 (or 7) may be a second capacitor contact for capacitor C". In accordance with aspects of the invention, capacitor C" has a first capacitance between contact 25 and contact 6 (or 7) when PCM 1 is in a first phase (e.g., amorphous), and capacitor C" has a second capacitance between contact 25 and contact 6 (or 7) when PCM 1 is in a second phase (e.g., crystalline). The second capacitance is different than the first capacitance due to the difference in electrical properties of the PCM 1 between the first phase and the second phase. For example, on the one hand, when the PCM 1 is in the amorphous phase (e.g., resistive), the PCM 1 serves as the capacitor dielectric, with the upper conductor 3 being a first capacitor conductor and the contact 6 (or 7) being the second capacitor conductor. On the other hand, when PCM 1 is in the crystalline phase (e.g., conductive), the capacitor C" may function as a conductive element (e.g., similar to a wire or interconnect) at DC voltage, and may function as a capacitor at higher frequencies. In this manner, changing the phase of PCM 1 can be used to change the capacitance of capacitor C".

As depicted in FIGS. 9-11, a variable capacitor in accordance with aspects of the invention includes a capacitor conductor (e.g., upper conductor 3) and a phase change material (e.g. PCM 1) adjacent the capacitor conductor. As used herein, adjacent refers to the phase change material directly contacting the capacitor conductor (e.g., as in FIG. 11) or the phase change material being separated from the capacitor conductor by a capacitor dielectric (e.g., upper dielectric 2 as in FIGS. 9 and 10).

Figure 12:
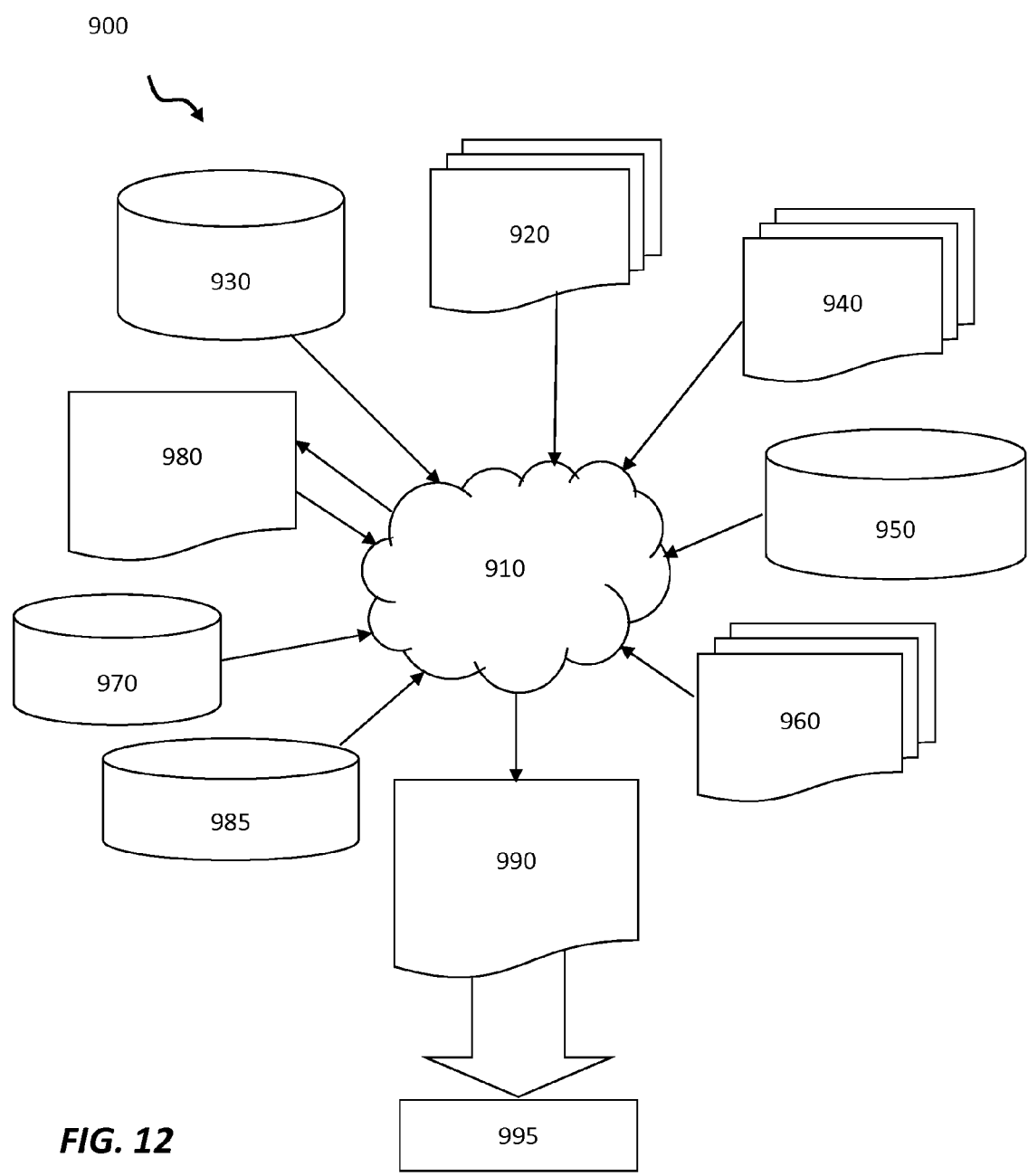
FIG. 12 is a flow diagram of a design process used in semiconductor design, manufacture, and/or test.

FIG. 12 shows a block diagram of an exemplary design flow 900 used for example, in semiconductor IC logic design, simulation, test, layout, and manufacture. Design flow 900 includes processes, machines and/or mechanisms for processing design structures or devices to generate logically or otherwise functionally equivalent representations of the design structures and/or devices described above and shown in FIGS. 1-11. The design structures processed and/or generated by design flow 900 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 900 may vary depending on the type of representation being designed. For example, a design flow 900 for building an application specific IC (ASIC) may differ from a design flow 900 for designing a standard component or from a design flow 900 for instantiating the design into a programmable array, for example a programmable gate array (PGA) or a field programmable gate array (FPGA) offered by Altera® Inc. or Xilinx® Inc.

FIG. 12 illustrates multiple such design structures including an input design structure 920 that is preferably processed by a design process 910. Design structure 920 may be a logical simulation design structure generated and processed by design process 910 to produce a logically equivalent functional representation of a hardware device. Design structure 920 may also or alternatively comprise data and/or program instructions that when processed by design process 910, generate a functional representation of the physical structure of a hardware device. Whether representing functional and/or structural design features, design structure 920 may be generated using electronic computer-aided design (ECAD) such as implemented by a core developer/designer. When encoded on a machine-readable data transmission, gate array, or storage medium, design structure 920 may be accessed and processed by one or more hardware and/or software modules within design process 910 to simulate or otherwise functionally represent an electronic component, circuit, electronic or logic module, apparatus, device, or system such as those shown in FIGS. 1-11. As such, design structure 920 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 910 preferably employs and incorporates hardware and/or software modules for synthesizing, translating, or otherwise processing a design/simulation functional equivalent of the components, circuits, devices, or logic structures shown in FIGS. 1-11 to generate a Netlist 980 which may contain design structures such as design structure 920. Netlist 980 may comprise, for example, compiled or otherwise processed data structures representing a list of wires, discrete components, logic gates, control circuits, I/O devices, models, etc. that describes the connections to other elements and circuits in an integrated circuit design. Netlist 980 may be synthesized using an iterative process in which netlist 980 is resynthesized one or more times depending on design specifications and parameters for the device. As with other design structure types described herein, netlist 980 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 910 may include hardware and software modules for processing a variety of input data structure types including Netlist 980. Such data structure types may reside, for example, within library elements 930 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 940, characterization data 950, verification data 960, design rules 970, and test data files 985 which may include input test patterns, output test results, and other testing information. Design process 910 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 910 without deviating from the scope and spirit of the invention. Design process 910 may also include modules for performing standard circuit design processes such as timing analysis, verification, design rule checking, place and route operations, etc.

Design process 910 employs and incorporates logic and physical design tools such as HDL compilers and simulation model build tools to process design structure 920 together with some or all of the depicted supporting data structures along with any additional mechanical design or data (if applicable), to generate a second design structure 990. Design structure 990 resides on a storage medium or programmable gate array in a data format used for the exchange of data of mechanical devices and structures (e.g. information stored in a IGES, DXF, Parasolid XT, JT, DRG, or any other suitable format for storing or rendering such mechanical design structures). Similar to design structure 920, design structure 990 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 1-11. In one embodiment, design structure 990 may comprise a compiled, executable HDL simulation model that functionally simulates the devices shown in FIGS. 1-11.

Design structure 990 may also employ a data format used for the exchange of layout data of integrated circuits and/or symbolic data format (e.g. information stored in a GDSII (GDS2), GL1, OASIS, map files, or any other suitable format for storing such design data structures). Design structure 990 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 1-11. Design structure 990 may then proceed to a stage 995 where, for example, design structure 990: proceeds to tape-out, is released to manufacturing, is released to a mask house, is sent to another design house, is sent back to the customer, etc.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A variable capacitor, comprising:
   a capacitor conductor;
   a phase change material adjacent the capacitor conductor;
   a first contact on the phase change material; and
   a second contact on the phase change material,
   wherein a conduction path between the first contact and the second contact includes at least a portion of the phase change material and excludes the capacitor conductor.

2. The variable capacitor of claim 1, further comprising a dielectric between the phase change material and the capacitor conductor.

3. The variable capacitor of claim 1, wherein the capacitor conductor comprises an upper capacitor conductor of the variable capacitor, the variable capacitor further comprising:
   an upper dielectric between an upper side of the phase change material and the upper capacitor conductor;
   a lower capacitor conductor; and
   a lower dielectric between a lower side of the phase change material and the lower capacitor conductor.

4. The variable capacitor of claim 3, further comprising:
   a third contact on the upper capacitor conductor; and
   a fourth contact on the lower capacitor conductor.

5. The variable capacitor of claim 1, wherein the phase change material is composed of a material that is selectively changeable between an amorphous phase and a crystalline phase.

6. The variable capacitor of claim 1, wherein the phase change material is composed of a material that is selectively changeable between a first phase having a high resistivity and a second phase having a low resistivity.

7. The variable capacitor of claim 1, wherein the phase change material comprises a chalcogenide material.

8. The variable capacitor of claim 1, wherein the capacitor conductor and the phase change material are formed in interlevel dielectric layers over a substrate.

9. The variable capacitor of claim 1, further comprising a control device connected to the first contact on the phase change material and the second contact on the phase change material.

10. The variable capacitor of claim 9, wherein the control device is configured to selectively apply a current through the conduction path between the first contact and the second contact for a predefined amount of time.

11. The variable capacitor of claim 10, wherein a magnitude of the current and the predefined amount of time are selected to one of: set the phase change material to a crystalline phase and reset the phase change material to an amorphous phase.

12. The variable capacitor of claim 9, wherein the control device is configured to selectively generate a voltage differential between the first contact and the second contact for a determined time, the voltage differential configured to drive a current through the conduction path between the first contact and the second contact for the determined time.

13. A method of manufacturing a variable capacitor, comprising:
   forming a capacitor conductor;
   forming a phase change material that is selectively changeable between one of a first phase and a second phase;
   forming a first contact on the capacitor conductor; and
   forming a second contact and a third contact on the phase change material,
   wherein the variable capacitor has a first capacitance when the phase change material is in the first phase and a second capacitance, different from the first capacitance, when the phase change material is in the second phase.

14. The method of claim 13, further comprising forming a capacitor dielectric between the capacitor conductor and the phase change material.

15. The method of claim 14, further comprising:
   forming an other capacitor conductor; and
   forming an other capacitor dielectric between the other capacitor conductor and the phase change material.

16. The method of claim 13, further comprising forming a control device configured to selectively change the phase change material to one of the first phase and the second phase.

17. The method of claim 16, wherein the control device is connected to the second contact and the third contact on the phase change material.

18. The method of claim 13, wherein:
   the capacitor conductor and the phase change material are formed in interlevel dielectric layers over a substrate;
   the phase change material comprises a chalcogenide material;
   the first phase is a high resistivity amorphous phase; and
   the second phase is a low resistivity crystalline phase.

19. A variable capacitor device, comprising:
a first layer comprising a phase change material;
a plurality of electrode layers, wherein each electrode layer comprises a conductor material and is coupled to a respective side of the first layer by a respective dielectric layer; and
a plurality of contacts, wherein each contact is coupled to the phase change material at a respective location on the first layer and is insulated from the conductor material of the electrode layers.

20. The variable capacitor device of claim 19, further comprising circuitry configured to selectively control a phase of the phase change material within the first layer by adjusting a voltage potential on one or more of the plurality of contacts.

\* \* \* \* \*